United States Patent
Sun et al.

(10) Patent No.: US 11,055,235 B2
(45) Date of Patent: Jul. 6, 2021

(54) STORAGE CELL USING CHARGE-TRAPPING DEVICES

(71) Applicant: eMemory Technology Inc., Hsin-Chu (TW)

(72) Inventors: Wein-Town Sun, Hsinchu County (TW); Ching-Hsiang Hsu, Hsinchu County (TW)

(73) Assignee: eMemory Technology Inc., Hsin-Chu (TW)

( * ) Notice: Subject to any disclaimer, the term of this patent is extended or adjusted under 35 U.S.C. 154(b) by 0 days.

(21) Appl. No.: 16/703,892

(22) Filed: Dec. 5, 2019

(65) Prior Publication Data

US 2020/0227121 A1 Jul. 16, 2020

Related U.S. Application Data

(60) Provisional application No. 62/791,870, filed on Jan. 13, 2019.

(51) Int. Cl.
*G11C 16/04* (2006.01)
*G06F 12/14* (2006.01)
(Continued)

(52) U.S. Cl.
CPC ...... *G06F 12/1408* (2013.01); *G06F 12/1425* (2013.01); *G06F 21/79* (2013.01); *G11C 11/1657* (2013.01); *G11C 11/1673* (2013.01); *G11C 11/1697* (2013.01); *G11C 11/4074* (2013.01); *G11C 11/5642* (2013.01); *G11C 13/004* (2013.01); *G11C 13/0028* (2013.01); *G11C 13/0038* (2013.01); *G11C 16/12* (2013.01); *G11C 16/14* (2013.01); *G11C 16/24* (2013.01); *G11C 16/26* (2013.01); *G11C 16/34* (2013.01)

(58) Field of Classification Search
CPC ...................................................... G11C 16/12
USPC ...................................................... 365/185.28
See application file for complete search history.

(56) References Cited

U.S. PATENT DOCUMENTS

| 9,997,244 B1 | 6/2018 | Chih | |
|---|---|---|---|
| 2005/0169085 A1 * | 8/2005 | Fujiwara | H01L 29/792 365/222 |

(Continued)

FOREIGN PATENT DOCUMENTS

| EP | 3270539 | | 1/2018 |
|---|---|---|---|
| TW | 200917260 | | 4/2009 |
| WO | 2010/007769 | A1 | 1/2010 |

*Primary Examiner* — Hoai V Ho
(74) *Attorney, Agent, or Firm* — Winston Hsu (57) ABSTRACT

A storage cell includes a selection circuit, a first memory transistor, and a second memory transistor. The selection circuit is coupled to a source line and a common node. When the selection circuit is turned on, the selection circuit forms an electrical connection between the source line and the common node. The first memory transistor has a first terminal coupled to the common node, a second terminal coupled to a first bit line, and a control terminal coupled to a control line. The second memory transistor has a first terminal coupled to the common node, a second terminal coupled to a second bit line, and a control terminal coupled to the control line. The first memory transistor and the second memory transistor are 2-dimension charge-trapping devices or 3-dimension charge-trapping devices.

19 Claims, 7 Drawing Sheets

(51) Int. Cl.
  *G06F 21/79* (2013.01)
  *G11C 11/16* (2006.01)
  *G11C 13/00* (2006.01)
  *G11C 11/56* (2006.01)
  *G11C 11/4074* (2006.01)
  *G11C 16/12* (2006.01)
  *G11C 16/14* (2006.01)
  *G11C 16/24* (2006.01)
  *G11C 16/26* (2006.01)
  *G11C 16/34* (2006.01)

(56) References Cited

U.S. PATENT DOCUMENTS

2005/0219900 A1 10/2005 Kamigaki
2008/0316831 A1 12/2008 Park
2009/0213656 A1* 8/2009 Ku .................... H01L 27/11568
　　　　　　　　　　　　　　　　　　　　　365/185.13
2017/0365643 A1* 12/2017 McElheny .......... H01L 27/2436

* cited by examiner

STORAGE CELL USING CHARGE-TRAPPING DEVICES

CROSS REFERENCE TO RELATED APPLICATIONS

This non-provisional application claims priority of U.S. provisional application No. 62/791,870, filed on Jan. 13, 2019, included herein by reference in its entirety.

BACKGROUND OF THE INVENTION

1. Field of the Invention

The present invention is related to a storage cell, and more particularly, to a storage cell using 2-dimension charge-trapping devices or 3-dimension charge-trapping devices.

2. Description of the Prior Art

As electronic devices are applied to more and more fields, information security between electronic devices and within electronic devices has raised great concerns. Since reverse engineering has become automatable on chips and devices, physical and side-channel attacks have become much more affordable and powerful. Therefore, it is more and more difficult to prevent the electronic devices from being accessed by unauthorized personnel.

In prior art, a physical unclonable function (PUF) circuit may be applied to generate random numbers as security keys for protecting the system from physical attacks due to its intrinsic characteristics. For example, the static random access memory (SRAM) has been used to implement the physical unclonable function circuit for generating random numbers since the latch of each SRAM cell is strongly dependent on the initial charge status of the SRAM cell and the initial charge status of the SRAM cell is unpredictable and uncontrollable. However, since the random number stored by the latch of the SRAM cell is volatile, it has to be regenerated every time when the power is reset.

SUMMARY OF THE INVENTION

One embodiment of the present invention discloses a storage cell for generating random numbers in a physical unclonable function (PUF) circuit. The storage cell includes a selection circuit, a first memory transistor, and a second memory transistor.

The selection circuit is coupled to a source line and a common node. The selection circuit is turned on to form an electrical connection between the source line and the common node, and turned off to block the electrical connection.

The first memory transistor has a first terminal coupled to the common node, a second terminal coupled to a first bit line, and a control terminal coupled to a control line. The second memory transistor has a first terminal coupled to the common node, a second terminal coupled to a second bit line, and a control terminal coupled to the control line. The first memory transistor and the second memory transistor are 2-dimension charge-trapping devices or 3-dimension charge-trapping devices.

Another embodiment of the present invention discloses a method for operating a storage cell. The storage cell includes a selection circuit, a first memory transistor, and a second memory transistor.

The selection circuit is coupled to a source line and a common node. The first memory transistor has a first terminal coupled to the common node, a second terminal coupled to a first bit line, and a control terminal coupled to a control line. The second memory transistor has a first terminal coupled to the common node, a second terminal coupled to a second bit line, and a control terminal coupled to the control line. The first memory transistor and the second memory transistor are 2-dimension charge-trapping devices or 3-dimension charge-trapping devices.

The method includes during an enroll operation, performing a first programming process, performing a first reading process to determine if one of the first memory transistor and the second memory transistor is programmed after the first programming process, and performing a second programming process according to a result of the first reading process.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
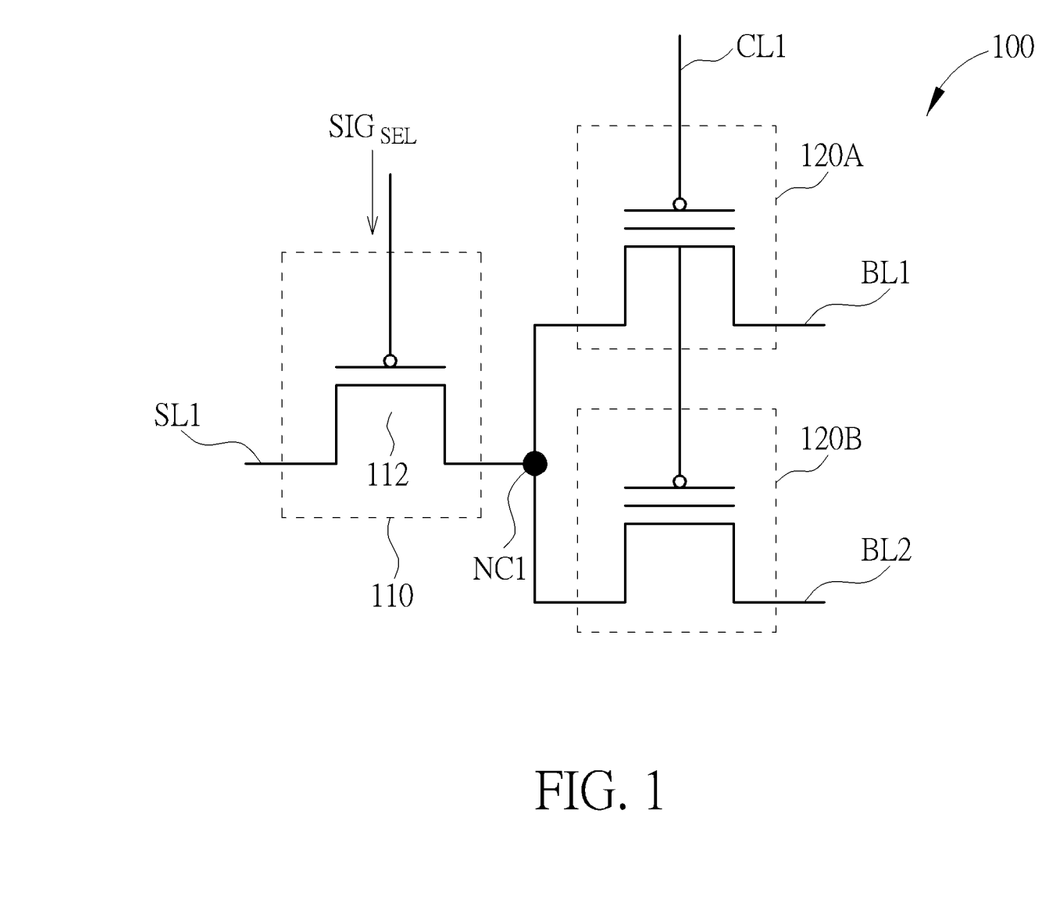
FIG. 1 shows a storage cell according to one embodiment of the present invention.

FIG. 1 shows a storage cell 100 according to one embodiment of the present invention. The storage cell 100 includes a selection circuit 110, and memory transistors 120A and 120B. In some embodiments, the memory transistors 120A and 120B are 2-dimension charge-trapping devices or 3-dimension charge-trapping devices. For example, the memory transistors 120A and 120B can be silicon-oxide-nitride-oxide-silicon (SONOS) transistors.

The selection circuit 110 can be coupled to a source line SL1 and a common node NC1. When the selection circuit 110 is turned on, the selection circuit can form an electrical connection between the source line SL1 and the common node NC1. Also, when the selection circuit 110 is turned off, the electrical connection would be blocked.

In FIG. 1, the selection circuit 110 includes a selection transistor 112. The selection transistor 112 has a first terminal coupled to the common node NC1, a second terminal coupled to the source line SL1, and a control terminal for receiving a select signal $SIG_{SEL}$.

Furthermore, the memory transistor 120A has a first terminal coupled to the common node NC1, a second terminal coupled to a bit line BL1, and a control terminal coupled to a control line CL1. The memory transistor 120B has a first terminal coupled to the common node NC1, a second terminal coupled to a bit line BL2, and a control terminal coupled to the control line CL1.

In some embodiments, to enroll the storage cell 100, that is, to produce and store a random bit like a physical unclonable function unit, a plurality of program operations may be performed to the memory transistors 120A and 120B. In this case, according to the unpredictable variations of physical structures between the memory transistors 120A and 120B, one of the memory transistors 120A and 120B will be programmed first while the other will not. Therefore, the different programming states of the memory transistors 120A and 120B can be recorded as a random bit.

Figure 2:
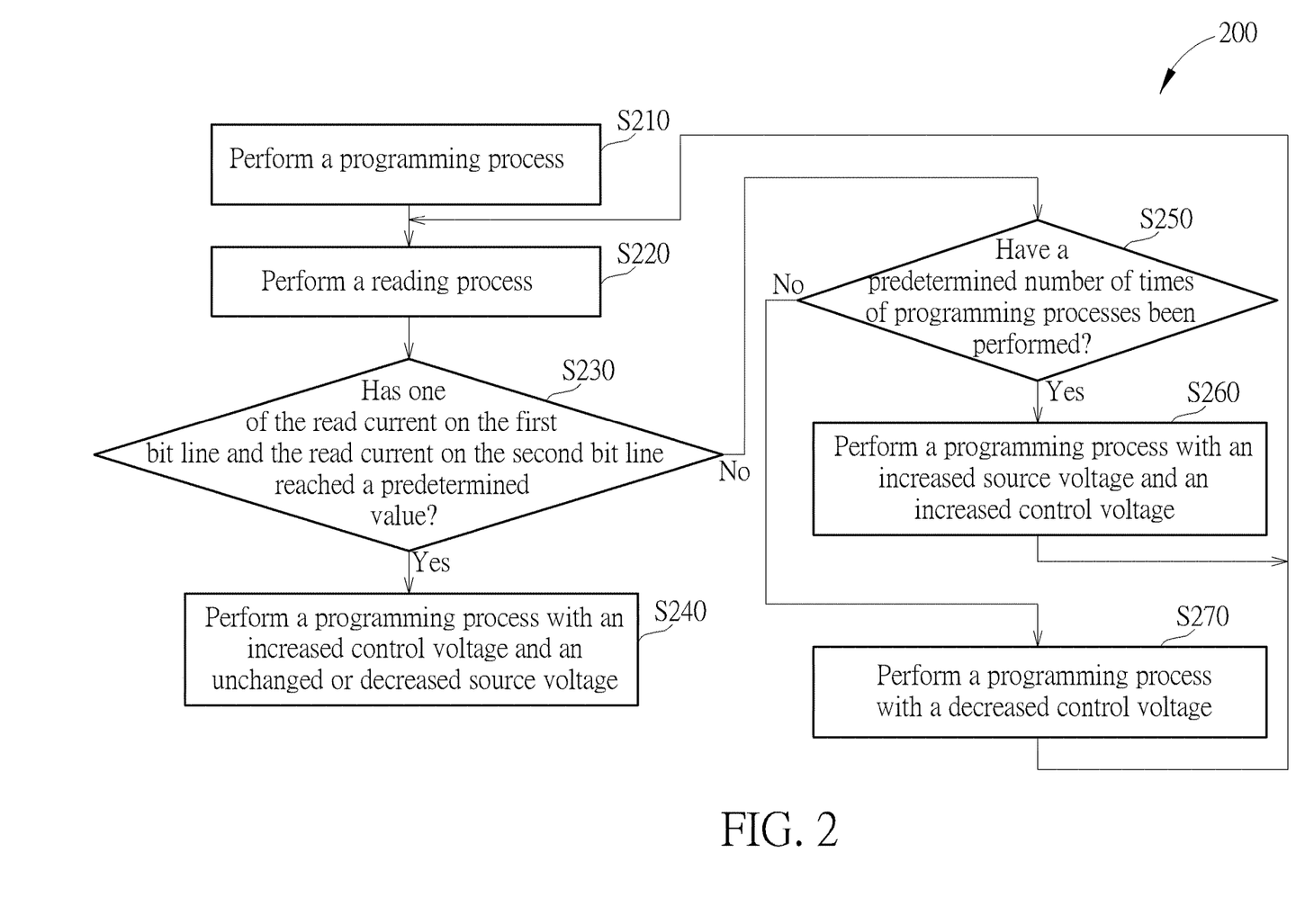
FIG. 2 shows a flow chart of a method for operating the storage cell in FIG. 1 during the enroll operation according to one embodiment of the present invention.
Figure 3:
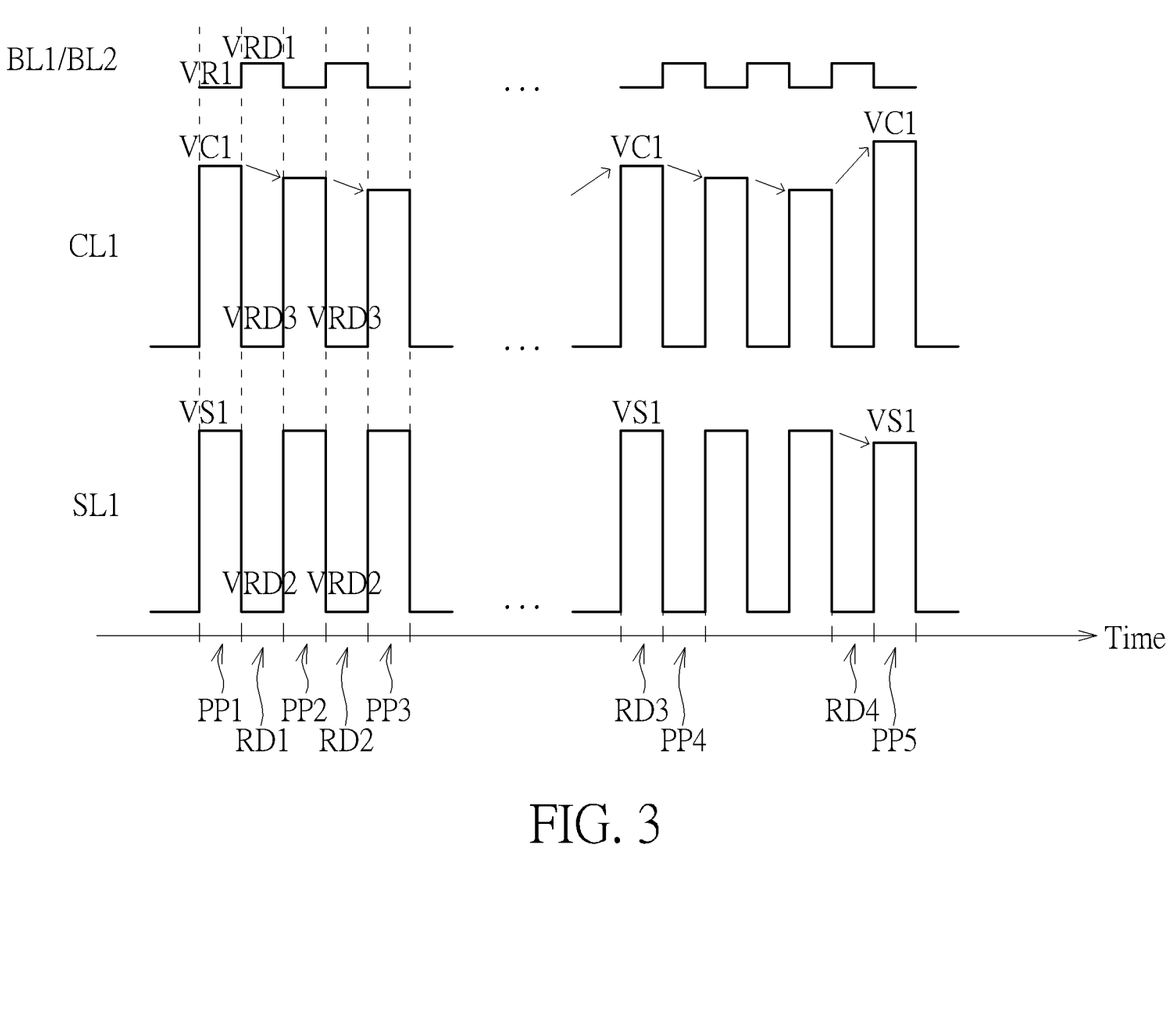
FIG. 3 shows the voltages received by the storage cell during the enroll operation according to the method in FIG. 2.

FIG. 2 shows a flow chart of a method 200 for operating the storage cell 100 during the enroll operation according to one embodiment of the present invention. FIG. 3 shows the voltages received by the storage cell 100 during the enroll operation according to the method 200. The method 200 includes steps S210 to S270.

S210: perform a programming process;
S220: perform a reading process;
S230: if one of the read currents on the bit lines BL1 and BL2 has reached a predetermined value, go to step S240, else go to step S250;
S240: perform a programming process with an increased control voltage VC1 and an unchanged or decreased source voltage VS1.
S250: if programming processes have been performed a predetermined number of times, go to step S260, else go to step S270;
S260: perform a programming process with an increased source voltage VS1 and an increased control voltage VC1, and go to step S220; and
S270: perform a programming process with a decreased control voltage VC1, and go to step S220.

In step S210, the programming process PP1 of the enroll operation can be performed by applying a source voltage VS1 to the source line SL1, applying a reference voltage VR1 to the bit lines BL1 and BL2, applying a control voltage VC1 to the control line CL1, and turning on the selection circuit 110 with the select signal $SIG_{SEL}$ at a voltage smaller than the source voltage VS1. Furthermore, the control voltage VC1 is greater than or substantially equal to the source voltage VS1, and the source voltage VS1 is greater than the reference voltage VR1. For example, but not limited to, the control voltage VC1 can be 7.4V, the source voltage VS1 can be 5.2V, and the reference voltage VR1 can be 0V during the programming process PP1.

In some embodiments, if the memory transistors 120A and 120B are not programmed, the resistance of the memory transistors 120A and 120B will maintain large, and the voltage of the common node NC1 will be close to the source voltage VS1, thereby forming an electric field between the first terminal and the second terminal of the memory transistor 120A and an electric field between the first terminal and the second terminal of the memory transistor 120B. In this case, the hot electron injection may be caused by the control voltage VC1 along with the electric fields formed on the memory transistors 120A and 120B.

However, due to the differences between the intrinsic characteristics of the memory transistors 120A and 120B, the hot electron injection will induced on one of the memory transistors 120A and 120B first. Furthermore, once the hot electron injection is induced on one of the memory transistors 120A and 120B, the voltage of the common node NC1 will be pulled down by the memory transistor that has trapped the electrons during the hot electron injection, thereby preventing the other memory transistor from trapping electrons.

In some embodiments, the hot electron injection may occur most significantly when the voltage difference between the control voltage VC1 and the source voltage VS1 is close to the threshold voltage of the memory transistor. Therefore, to avoid the two memory transistors 120A and 120B from trapping electrons too fast to distinguish the differences, the control voltage VC1 can be greater than or equal to the source voltage VS1 during the programming process PP1. Consequently, the read currents of the memory transistors 120A and the 120B may not reach a predetermined value by one single programming process, and the difference between the threshold voltages of the memory transistors 120A and 120B can be expanded gradually during the following programming processes.

After the programming process PP1, the reading process RD1 can be performed in step S220 to determine if one of read currents on the bit lines BL1 and BL2 has reached the predetermined value after the previous programming process PP1. In FIG. 3, the reading process RD1 can be performed by applying a first read voltage VRD1 to the bit lines BL1 and BL2, applying a second read voltage VRD2 greater than the first read voltage VRD1 to the source line SL1, turning on the selection circuit 110, and applying a third read voltage VRD3 greater than the second read voltage VRD2 to the control line CL1. For example, but not limited to, the first read voltage VRD1 can be 1V, the second read voltage VRD2 can be 2.2V, and the third read voltage VRD3 can be 2.4V.

In this case, if the memory transistor 120A has trapped enough of electrons due to the hot electron injection during the programming process PP1, a significant read current will flow through the memory transistor 120A and the bit line BL1. However, if the memory transistor 120A has not trapped enough of electrons, the read current on the bit line BL1 would be insignificant. Therefore, by detecting the read currents on the bit lines BL1 and BL2, the programming states of the memory transistors 120A and 120B can be determined during the reading process RD1. In some embodiments, the predetermined value of the read current used to verify the programming state can be, for example but not limited to, 1 µA or 5 µA, depending on the system requirement.

In FIG. 3, since neither of the read currents on the bit lines BL1 and BL2 has reached the predetermined value, step S250 will be performed after step S230. In step S250, since the programming process has been performed only once, that is, the programming processes has not been performed more than a predetermined number of times (e.g., 10 times), step S270 should be performed next to step S250 as indicated by the flow chart shown in FIG. 2. In step S270, the programming process PP2 of the enroll operation can be performed with a decreased control voltage VC1.

In this case, since the control voltage VC1 is decreased, the voltage difference between the control voltage VC1 and the source voltage VS1 may further approach to the threshold voltage of the memory transistors 120A and 120B. Therefore, the hot electron injection may occur more easily during the programming process PP2.

After the programming process PP2, step S220 will be performed again to determine the programming state. In FIG. 3, since the read currents on the bit lines BL1 and BL2 have not reached the predetermined value during the reading process RD2, another programming process PP3 will be performed with the control voltage VC1 being further decreased.

In some embodiments, steps S250, S270 and S220 can be performed repetitively until one of the read currents on the bit lines BL1 and BL2 has reached the predetermined value. However, if the programming processes have been performed more than a predetermined number of times, for example, but not limited to 10 times, the control voltage VC1 may have been decreased to a level that is no longer suitable for the hot electron injection for the control voltage VC1 is decreased every time when step S270 is performed. Therefore, as suggested in steps S250 and S260, the following programming process may be performed with an increased source voltage VS1 and an increased control voltage VC1, thereby maintaining a proper environment for the hot electron injection.

For example, in FIG. 3, if neither of the read currents on the bit lines BL1 and BL2 has reached the predetermined value during the reading process RD3 corresponding to steps S220 and S230, then step S250 will further check the number of times of the programming processes that have been performed. Since neither of the read currents on the bit lines BL1 and BL2 has reached the predetermined value after the predetermined number of times of programming processes, the programming process PP4 can be performed with the source voltage VS1 and the control voltage VC1 both being increased as step S260. In some embodiments, the control voltage VC1 can be increased to a level that is even greater than the level used in the programming process PP1.

In some embodiments, since the decreasing voltage step of the control voltage VC1 between each two programming processes will determine the decreasing speed of the control voltage VC1, the predetermined number of times may be decided with the decreasing voltage step of the control voltage VC1 within each programming process.

In addition, if neither of the read currents on the bit lines BL1 and BL2 has reached the predetermined value after the programming process PP4, the control voltage VC1 will be decreased in the following programming processes as shown in FIG. 3, thereby increasing the possibility of the hot electron injection. That is, in some embodiments, the system may use a counter to record the number of times of the programming processes being performed. Once the condition in step S250 is met, the programming process will be performed with the source voltage VS1 and the control voltage VC1 both being increased as step S260. Meanwhile, the counter will be reset and the control voltage VC1 will be decreased in the next programming process.

In FIG. 3, during the reading process RD4, one of the read currents on the bit lines BL1 and BL2 is determined to be reaching the predetermined value in step S230; therefore, the programming process PP5 will be performed with an increased control voltage VC1 and an unchanged or decreased source voltage VS1 in step S240.

In this case, the increased control voltage VC1 can help to further raise the threshold voltage of the memory transistor that has captured some electrons during the hot electron injections, and can also help to avoid the other memory transistor from being programmed. Consequently, after the enroll operation, one of the memory transistors 120A and 120B will be programmed, and the other one will remain unprogrammed. Therefore, the programming states of the memory transistors 120A and 120B can be used as the random bit generated by the storage cell 100. For example, if the memory transistor 120A is programmed and the memory transistor 120B is not programmed, the random bit may be assigned to be "1", else the random bit may be assigned to be "0".

In some embodiments, the programming state can be read by performing the read operation similar to the read process performed during the enroll operation. For example, during the read operation, the bit lines BL1 and BL2 can be at the first read voltage VRD1, the source line SL1 can be at the second read voltage VRD2, and the control line CL1 can be at the third read voltage VRD3. Also, the selection circuit 110 is turned on. In this case, by detecting the currents on the bit lines BL1 and BL2 during the read operation, the random bit stored in the storage cell 100 can be read.

Furthermore, in some embodiments, the erase operation can be performed to erase the random bit stored in the storage cell 100. For example, during the erase operation, the source line SL1 and the bit lines BL1 and BL2 can all be at a first erase voltage, and the control line CL1 can be at a second erase voltage smaller than the first erase voltage. Also, the selection circuit 110 is turned on during the erase operation. In some embodiments, the first erase voltage can be 6.4V, and the second erase voltage can be −6V so the large potential applied on the memory transistors 120A and 120B can cause the Fowler-Nordheim tunneling, thereby erasing the storage cell 100.

In some embodiments, the storage cell 100 can be enrolled again after the erase operation. However, since the erase operation may alter some of the characteristics of the memory transistors 120A and 120B, the result of the enroll operation after the erase operation may not be the same as the enroll operation before the erase operation.

Figure 4:
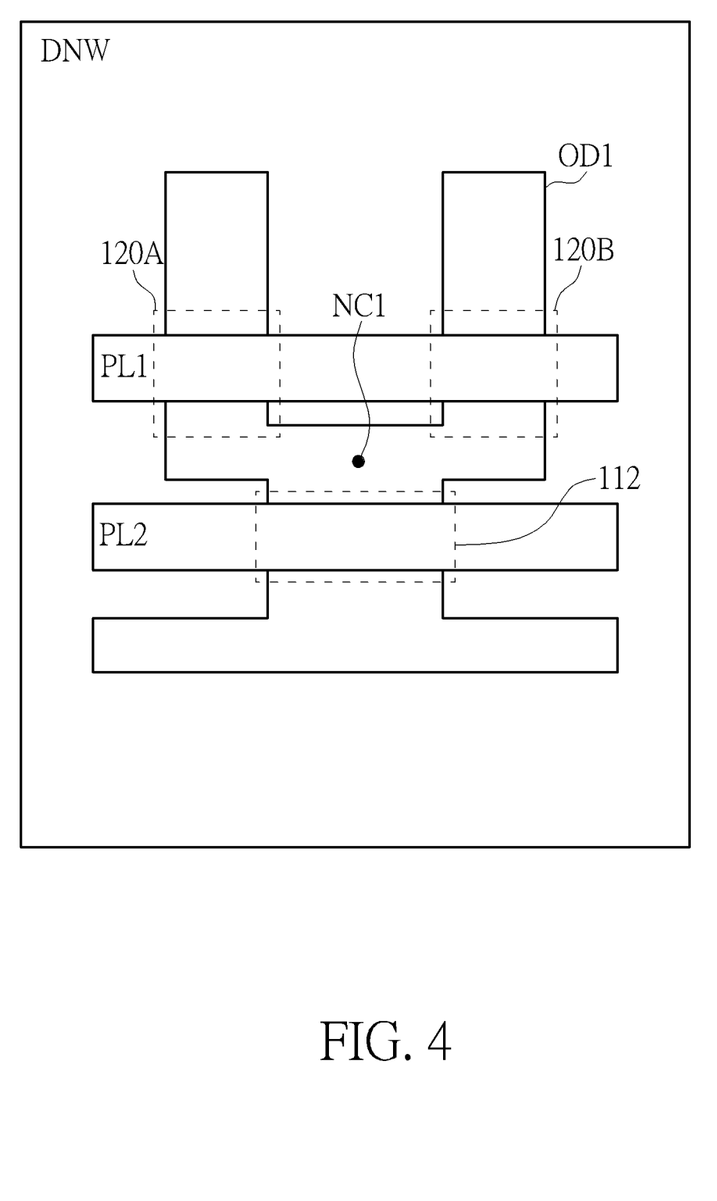
FIG. 4 shows a layout of the storage cell in FIG. 1 according to one embodiment of the present invention.

FIG. 4 shows a layout of the storage cell 100 according to one embodiment of the present invention. In FIG. 4, the selection transistor 112 and the memory transistors 120A and 120B are disposed in the deep N-well DNW. The memory transistors 120A and 120B can be formed with the diffusion layer OD1 and the polysilicon layer PL1, and the selection transistor 112 can be formed with the diffusion layer OD1 and the polysilicon layer PL2. That is, the first terminal of the selection transistor 112, the first terminal of the memory transistor 120A, and the first terminal of the memory transistor 120B can be coupled to the common node NC1 through the oxide diffusion layer OD1.

Also, in FIG. 4, the channel width of the selection transistor 112 can be smaller than a sum of a channel width of the memory transistor 120A and a channel width of the memory transistor 120B. In this case, once the hot electron injection is induced on one of the memory transistors 120A and 120B during the programming process of the enroll operation, the voltage of the common node NC1 will be decreased faster, further ensuring that the other memory transistor will remain unprogrammed.

Figure 5:
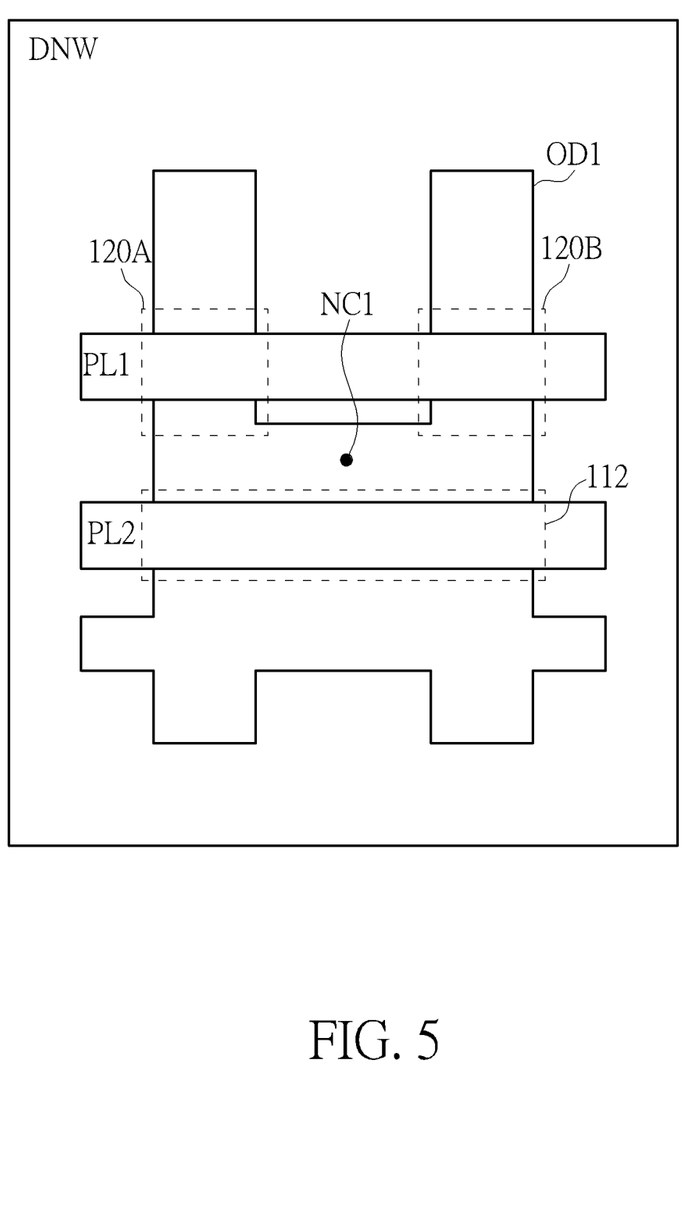
FIG. 5 shows a layout of the storage cell in FIG. 1 according to another embodiment of the present invention.

However, in some other embodiments, the channel width of the selection transistor 112 may be greater than the sum of the channel width of the memory transistor 120A and the channel width of the memory transistor 120B to ensure the symmetrical configuration of the structure. FIG. 5 shows a layout of the storage cell 100 according to another embodiment of the present invention. In FIG. 5, the oxide diffusion layer OD1 can be extended from the memory transistors 120A and 120B directly to preserve a simple contour so the symmetrical structure can be further preserved during the manufacturing process, thereby maintaining the randomness of the result of the enroll operation.

Figure 6:
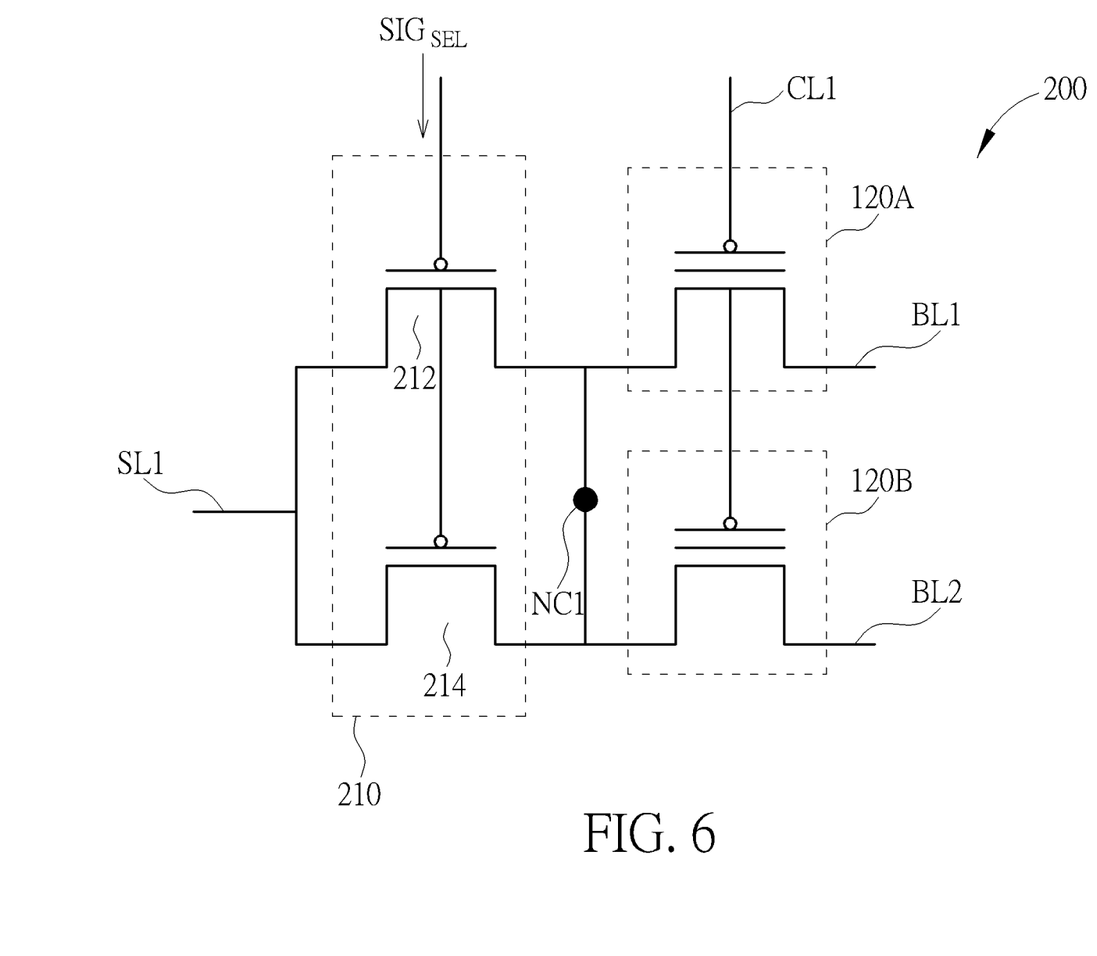
FIG. 6 shows a storage cell according to another embodiment of the present invention.

In addition, since the symmetrical structure of the storage cell 100 may help to maintain the randomness of the result of the enroll operation, the selection circuit of the storage cell may include two selection transistors in some embodiments. FIG. 6 shows a storage cell 200 according to one embodiment of the present invention.

The storage cell 200 and the storage cell 100 have similar structures and can be operated with similar principles. However, the selection circuit 210 of the storage cell 200 includes two selection transistors 212 and 214.

The selection transistor 212 has a first terminal coupled to the common node NC1 and the first terminal of the memory transistor 120A, a second terminal coupled to the source line SL1, and a control terminal for receiving a select signal $SIG_{SEL}$. The selection transistor 214 has a first terminal coupled to the common node NC1 and the first terminal of the memory transistor 120B, a second terminal coupled to the source line SL1, and a control terminal for receiving the select signal $SIG_{SEL}$.

Figure 7:
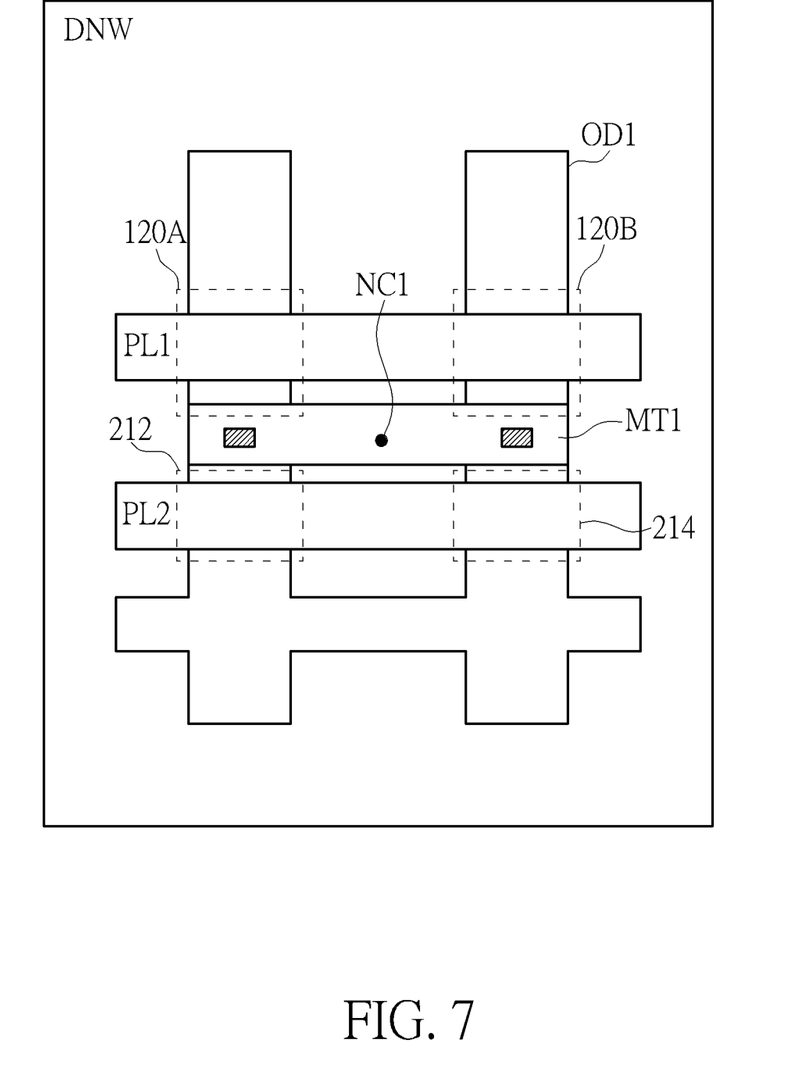
FIG. 7 shows a layout of the storage cell in FIG. 6 according to one embodiment of the present invention.

In FIG. 6, since the memory transistors 120A and 120B can be coupled to the selection transistors 212 and 214 respectively, the symmetrical layout of the storage cell 200 may be better preserved during the manufacturing process. FIG. 7 shows a layout of the storage cell 200 according to one embodiment of the present invention. In FIG. 7, the first terminal of the selection transistor 212, the first terminal of the selection transistor 214, the first terminal of the memory transistor 120A, and the first terminal of the memory transistor 120B can be coupled to the common node NC1 through a metal layer MT1.

Although in FIG. 7, the metal layer MT1 is used to connect the selection transistors 212 and 214, and the memory transistors 120A and 120B to the common node NC1, in some other embodiments, the first terminal of the selection transistor 212, the first terminal of the selection transistor 214, the first terminal of the memory transistor 120A, and the first terminal of the memory transistor 120B can be coupled to the common node NC1 through a diffusion layer according to the requirement.

In summary, the storage cell provided by the embodiments of the present invention can generate and store the random bit with 2-dimension charge-trapping devices or 3-dimension charge-trapping devices. Furthermore, the random bit stored in the storage cell can be erased when required, improving the flexibility and information safety of the storage cell.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A storage cell comprising:
a selection circuit coupled to a source line and a common node, and configured to be turned on to form an electrical connection between the source line and the common node, and turned off to block the electrical connection, the selection circuit comprising a first selection transistor having a first terminal coupled to the common node, a second terminal coupled to the source line, and a control terminal configured to receive a select signal;
a first memory transistor having a first terminal coupled to the common node, a second terminal coupled to a first bit line, and a control terminal coupled to a control line; and
a second memory transistor having a first terminal coupled to the common node, a second terminal coupled to a second bit line, and a control terminal coupled to the control line;
wherein the first memory transistor and the second memory transistor are 2-dimension charge-trapping devices or 3-dimension charge-trapping devices; and
wherein a channel width of the first selection transistor is smaller than a sum of a channel width of the first memory transistor and a channel width of the second memory transistor.

2. The storage cell of claim 1, wherein during a first programming process of an enroll operation:
the source line is at a source voltage (VPP);
the selection circuit is turned on;
the first bit line and the second bit line are at a reference voltage;
the control line is at a control voltage (VZCL); and
the control voltage is greater than or substantially equal to the source voltage, and the source voltage is greater than the reference voltage.

3. The storage cell of claim 2, wherein during a first reading process of the enroll operation after the first programming process of the enroll operation:
the first bit line and the second bit line are at a first read voltage;
the source line is at a second read voltage greater than the first read voltage;
the selection circuit is turned on; and
the control line is at a third read voltage greater than the second read voltage.

4. The storage cell of claim 3, wherein:
when a read current on the first bit line or a read current on the second bit line has reached a predetermined value during the first reading process, a second programming process of the enroll operation is performed with an increased control voltage and a decreased or unchanged source voltage.

5. The storage cell of claim 3, wherein:
when a read current on the first bit line and a read current on the second bit line do not reach a predetermined value after the first reading process, a second programming process of the enroll operation is performed with a decreased control voltage.

6. The storage cell of claim 3, wherein:
when a read current on the first bit line and a read current on the second bit line do not reach a predetermined value after the first reading process and a predetermined number of times of programming processes have been performed, a second programming process of the enroll operation is performed with an increased source voltage and an increased control voltage.

7. The storage cell of claim 1, wherein during a read operation:
the first bit line and the second bit line are at a first read voltage;
the source line is at a second read voltage greater than the first read voltage;
the selection circuit is turned on; and
the control line is at a third read voltage greater than the second read voltage.

8. The storage cell of claim 1, wherein during an erase operation:
the source line, the first bit line and the second bit line are at a first erase voltage;
the selection circuit is turned on; and
the control line is at a second erase voltage smaller than the first erase voltage.

9. The storage cell of claim 1, wherein the first terminal of the first selection transistor, the first terminal of the first memory transistor, and the first terminal of the second memory transistor are coupled to the common node through an oxide diffusion layer.

10. A storage cell comprising:
a selection circuit coupled to a source line and a common node, and configured to be turned on to form an electrical connection between the source line and the common node, and turned off to block the electrical connection;
a first memory transistor having a first terminal coupled to the common node, a second terminal coupled to a first bit line, and a control terminal coupled to a control line; and
a second memory transistor having a first terminal coupled to the common node, a second terminal coupled to a second bit line, and a control terminal coupled to the control line;
wherein the first memory transistor and the second memory transistor are 2-dimension charge-trapping devices or 3-dimension charge-trapping devices, and wherein the selection circuit comprises:
a first selection transistor having a first terminal coupled to the common node and the first terminal of the first memory transistor, a second terminal coupled to the source line, and a control terminal configured to receive a select signal; and
a second selection transistor having a first terminal coupled to the common node and the first terminal of the second memory transistor, a second terminal coupled to the source line, and a control terminal configured to receive the select signal.

11. The storage cell of claim 10, wherein the first terminal of the first selection transistor, the first terminal of the second selection transistor, the first terminal of the first memory transistor, and the first terminal of the second memory transistor are coupled to the common node through an oxide diffusion layer.

12. The storage cell of claim 10, wherein the first terminal of the first selection transistor, the first terminal of the second selection transistor, the first terminal of the first memory transistor, and the first terminal of the second memory transistor are coupled to the common node through a metal layer.

13. A method for operating a storage cell, the storage cell comprising a selection circuit, a first memory transistor, and a second memory transistor, the selection circuit being coupled to a source line and a common node, the first memory transistor having a first terminal coupled to the common node, a second terminal coupled to a first bit line, and a control terminal coupled to a control line, and the second memory transistor having a first terminal coupled to the common node, a second terminal coupled to a second bit line, and a control terminal coupled to the control line, the method comprising:
during an enroll operation:
performing a first programming process;
performing a first reading process to determine if one of a read current on the first bit line and a read current on the second bit line has reached a predetermined value after the first programming process; and
performing a second programming process according to a result of the first reading process;
wherein the first memory transistor and the second memory transistor are 2-dimension charge-trapping devices or 3-dimension charge-trapping devices.

14. The method of claim 13, wherein performing the first programming process comprises:
applying a source voltage (VPP) to the source line;
turning on the selection circuit; and
applying a control voltage (VZCL) to the control line;
applying a reference voltage to the first bit line and the second bit line;
wherein the first control voltage is greater than or substantially equal to the first source voltage, and the source voltage is greater than the reference voltage.

15. The method of claim 14, wherein performing the first reading process to determine if one of the read current on the first bit line and the read current on the second bit line has reached the predetermined value after the first programming process comprises:
applying a first read voltage to the first bit line and the second bit line;
applying a second read voltage greater than the first read voltage to the source line;
turning on the selection circuit; and
applying a third read voltage greater than the second read voltage to the control line.

16. The method of claim 14, wherein performing the second programming process according to the result of the first reading process comprises when one of the read current on the first bit line and the read current on the second bit line has reached the predetermined value after the first programming process:
performing the second programming process with an increased control voltage and a decreased or unchanged source voltage.

17. The method of claim 14, wherein performing the second programming process according to the result of the first reading process comprises when neither of the read current on the first bit line and the read current on the second bit line has reached the predetermined value after the first reading process:
performing the second programming process with a decreased control voltage.

18. The method of claim 14, wherein performing the second programming process according to the result of the first reading process comprises when neither of the read current on the first bit line and the read current on the second bit line has reached the predetermined value after the first reading process and a predetermined number of times of programming processes have been performed:
performing the second programming process with an increased source voltage and an increased control voltage.

19. A storage cell comprising:
a selection circuit coupled to a source line and a common node, and configured to be turned on to form an electrical connection between the source line and the common node, and turned off to block the electrical connection;
a first memory transistor having a first terminal coupled to the common node, a second terminal coupled to a first bit line, and a control terminal coupled to a control line; and
a second memory transistor having a first terminal coupled to the common node, a second terminal coupled to a second bit line, and a control terminal coupled to the control line;
wherein the first memory transistor and the second memory transistor are 2-dimension charge-trapping devices or 3-dimension charge-trapping devices; and wherein during a first programming process of an enroll operation:
   the source line is at a source voltage (VPP);
   the selection circuit is turned on;
   the first bit line and the second bit line are at a reference voltage;
   the control line is at a control voltage (VZCL); and
   the control voltage is greater than or substantially equal to the source voltage, and the source voltage is greater than the reference voltage.

* * * * *